(12) United States Patent
Chikh

(10) Patent No.: US 11,008,003 B2
(45) Date of Patent: May 18, 2021

(54) DEVICE FOR MAKING SAFE A STATIONARY VEHICLE IN THE PRESENCE OF A RISK OF COLLISION FROM THE REAR

(71) Applicant: PSA AUTOMOBILES SA, Poissy (FR)

(72) Inventor: Youssef Chikh, Puteaux (FR)

(73) Assignee: PSA AUTOMOBILES SA, Poissy (FR)

( * ) Notice: Subject to any disclaimer, the term of this patent is extended or adjusted under 35 U.S.C. 154(b) by 210 days.

(21) Appl. No.: 16/318,662

(22) PCT Filed: Jul. 7, 2017

(86) PCT No.: PCT/FR2017/051858
§ 371 (c)(1),
(2) Date: Jan. 17, 2019

(87) PCT Pub. No.: WO2018/015635
PCT Pub. Date: Jan. 25, 2018

(65) Prior Publication Data
US 2019/0241178 A1 Aug. 8, 2019

(30) Foreign Application Priority Data
Jul. 21, 2016 (FR) ...................... 1656988

(51) Int. Cl.
*B60W 30/09* (2012.01)
*B60W 30/18* (2012.01)
(Continued)

(52) U.S. Cl.
CPC .......... *B60W 30/09* (2013.01); *B60W 30/095* (2013.01); *B60W 30/0956* (2013.01);
(Continued)

(58) Field of Classification Search
CPC ..................... B60W 50/14; B60W 2554/00
See application file for complete search history.

(56) References Cited

U.S. PATENT DOCUMENTS 7,840,331 B2 * 11/2010 Yoshioka ............... G08G 1/164
701/96
9,672,734 B1 * 6/2017 Ratnasingam ....... G08G 1/0968
(Continued)

FOREIGN PATENT DOCUMENTS

DE        10244205 A1     3/2004
DE     102005062275 A1     6/2007
(Continued)

OTHER PUBLICATIONS

International Search Report for corresponding PCT/FR2017/051858, dated Sep. 13, 2017.
(Continued)

*Primary Examiner* — Tan Q Nguyen
(74) *Attorney, Agent, or Firm* — Sandberg Phoenix & von Gontard, P C.

(57) ABSTRACT

A safety device (DS) equips a first vehicle (V1) comprising analysis means (MA1-MA2) suitable for analyzing its environment. This device (DS) comprises control means (MC) designed, when the first vehicle (V1) is stationary and has its contact open, and in the presence of a risk of collision of the first vehicle (V1) by a second vehicle (V2) travelling behind it, to determine whether there exists in this analysed environment at least one empty zone (ZV1) accessible by the first vehicle (V1), and, in the affirmative, to determine for the latter (V1) a trajectory in this empty zone (ZV1) suitable at least for limiting the consequences of this collision, and then to trigger a displacement of the first vehicle (V1) according to this determined trajectory. The device considers the
(Continued)

presence of a third vehicle (V3) travelling on another lane (VC3), in the environment of the first vehicle.

9 Claims, 2 Drawing Sheets

(51) Int. Cl.
 *B60W 30/095* (2012.01)
 *B60W 50/14* (2020.01)
 *G08G 1/16* (2006.01)
(52) U.S. Cl.
 CPC ...... *B60W 30/18054* (2013.01); *B60W 50/14* (2013.01); *B60W 2554/00* (2020.02)

(56) References Cited

U.S. PATENT DOCUMENTS

| 2004/0090117 | A1 | 5/2004 | Dudeck et al. | |
| 2004/0090319 | A1* | 5/2004 | Kimura | G08G 1/167 340/435 |
| 2004/0128062 | A1* | 7/2004 | Ogino | G01C 21/3697 701/400 |
| 2006/0152346 | A1* | 7/2006 | Maass | B60Q 9/008 340/425.5 |
| 2006/0267748 | A1* | 11/2006 | Knoop | B60R 21/013 340/435 |

FOREIGN PATENT DOCUMENTS

| DE | 102009013564 A1 | 11/2009 |
| DE | 102010001304 A1 | 9/2011 |

OTHER PUBLICATIONS

Written Opinion for corresponding PCT/FR2017/051858, dated Sep. 13, 2017.

* cited by examiner

DEVICE FOR MAKING SAFE A STATIONARY VEHICLE IN THE PRESENCE OF A RISK OF COLLISION FROM THE REAR

CROSS-REFERENCE TO RELATED APPLICATIONS

This application is the US National Stage under 35 U.S.C. § 371 of International App. No. PCT/FR2017/051858, filed Jul. 7, 2017, which in turn, claims priority to French App. No. 1656988 filed Jul. 21, 2016. Both of said applications are incorporated herein by reference.

BACKGROUND

The invention deals with securing devices that are mounted on some vehicles, such as cars, and that are designed to prevent collisions with other vehicles as much as possible.

A person skilled in the art knows that some vehicles, typically cars, include security devices (or driving aids) that are designed to have an effect on them, possibly to warn drivers when they move with a risk of collision with a movable obstacle, like a vehicle, a pedestrian or an animal.

These security devices use analyses of the (outer) environment of the vehicle, made by onboard analysis means, to determine one or more actions to initiate in case of collision risk. These environment analysis means may include, for example, ultrasonic sensors and/or at least one camera and/or at least one scanning laser and/or at least one radar or lidar.

Known actions that a security device can decide in case of a risk of collision with a following vehicle include the vehicle changing of traffic lane or increasing the distance between the vehicle and the follower (by way of a short increase of the current speed).

If the vehicle is stationary, the security device can trigger several actions. For example, it can close open windows and the sunroof if there is one, pre-tension the seat belts, move the movable seats to the front and/or increase the pressure inside the brakes so that the vehicle does not move if it is hit and/or trigger a security movement of the head supports to avoid whiplash. All these actions only reduce some consequences of a possible rear collision of the vehicle, but they do not prevent collision.

SUMMARY

The object of the present invention is notably to improve the above-described situation.

For this purpose, a security device is disclosed which is designed for the equipment of a first vehicle. The security device includes analysis means adequate to analyze the vehicle's environment, and control means designed, when the first vehicle is stationary with an open contact and in case of a risk of collision of the first vehicle by a second vehicle behind it:

to determine whether there is at least one accessible empty zone for the first vehicle in this environment, and if so, to set for the first vehicle a route through this empty zone convenient to at least minimize the consequences of the collision, and then to initiate the movement of the first vehicle according to the route.

Thus, in the best case, collision will be prevented, and in the worst case, collision will happen at a side of the first vehicle, which notably reduces the consequences on it and on its passengers.

The security device can include other characteristics, separately or in combination, notably:

in case of detection of a collision risk, the first vehicle's control means may be designed to initiate a warning to the passenger(s) of the first vehicle;

in case of detection of a collision risk, the first vehicle's control means can be designed to activate the car lighting and/or an acoustic alarm of the first vehicle, in order to warn the environment of the movement of the first vehicle;

the car lighting can be selected from among (at least) brake lights and hazard lights;

in case of detection of an empty zone in front of the first vehicle, the first vehicle's control means can be designed to set a linear forward route through this determined empty zone;

the first vehicle's control means can be designed to set a linear forward route of a minimal length, in order to prevent any collision in front of the first vehicle;

in the absence of an empty zone in front of the first vehicle but detection of an empty zone in a rear lateral zone of the first vehicle, the first vehicle's control means can be designed to set for the first vehicle a curved route to the rear part of the determined empty zone, so that the second vehicle will collide diagonally with a lateral part of the first vehicle;

in case of detection of two empty zones on the right and on the left of a rear part of the first vehicle, the first vehicle's control means can be designed to set a curve route to the rear of the empty zone that is on a lateral part closer to the driver of the first vehicle.

The invention also discloses a car that includes analysis means adequate to analyze the car's environment and a security device as previously disclosed.

DESCRIPTION OF THE DRAWINGS

Other characteristics and advantages of the invention will become apparent when examining the detailed description hereafter and appended drawings, wherein.

DESCRIPTION

A security device DS is disclosed which is designed to equip a (first) vehicle V1 in order to minimize the consequences of a rear-end collision when the first vehicle is stationary while having an open contact.

In this context, "open contact" means that the contact of the vehicle has been set, so that its powertrain (or GMP) and its power circuit are at least activated. In the case of a powertrain with an internal combustion engine and without any control system of temporary stops for it (or "stop and start" (or STT)), this means that this internal combustion engine is on and idle, and in the case of a with an internal combustion engine and a STT system, this means that this internal combustion engine is temporarily off, but can be automatically restarted any time. For example, you can make this opening by inducing the rotation of the ignition key or by pressing a starter button or by inserting an electronic key into a dedicated starter housing.

The internal combustion engine is restarted in the STT configuration, for example, by pressing on the clutch pedal or by releasing the brake pedal. In this peculiar case, the restart order of the internal combustion engine shall be given as soon as the imminence of a hit has been detected, as we shall see later.

Furthermore, "stationary" is understood to mean that the first vehicle V1 does not move or nearly does not move, for example because it is at an intersection where it has to give way for regulatory reasons, or because there is a stop sign, or yield sign or a traffic light, or in a parking lot, or along a street, or along a road.

In the following, as a non-limiting example, the first vehicle V1 is a type of automobile. For example, it is a car. But the invention is not restricted to this kind of motor vehicle. It deals indeed with any kind of terrestrial or marine (or river) vehicle, notably with trucks, buses, utility vehicles, construction machines and agricultural vehicles that may travel on roads, motorcycles, motor boats, trains and tramways.

The FIGS. 1 to 4 schematically display the intersection IS of a first and a second road, wherein the first road reaches the second road at a stop sign. The first road includes first and second traffic lanes VC1, VC2 with opposite directions of traffic, and the second road includes third and fourth traffic lanes VC3, VC4 with opposite directions of traffic.

Figure 1:
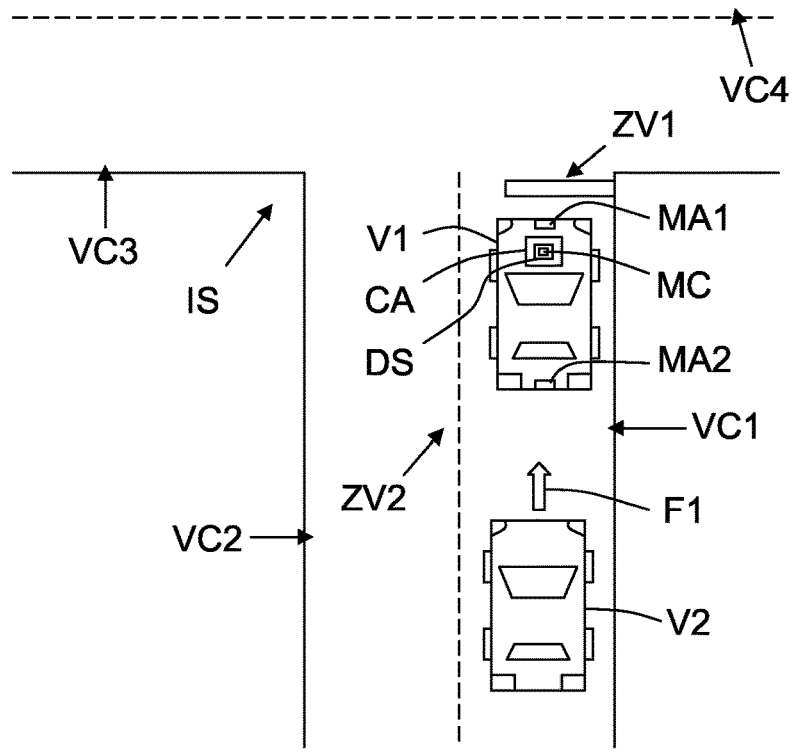
FIG. 1 schematically and functionally describes, in a view from above, an example of an intersection where a first vehicle with a security device is stopped at a stop sign, wherein a second vehicle is coming behind it too fast to stop without hitting it, FIG. 2 schematically and functionally describes, in a view from above, the intersection of FIG. 1 after a forward movement of the first vehicle, as decided by its security device, that made it possible to the second vehicle to stop without hitting it, FIG. 3 schematically and functionally describes, in a view from above, an example of an intersection where a first vehicle with a security device is stopped at a stop sign, wherein a second vehicle is coming behind it too fast to stop without hitting it, and wherein a third vehicle having a high priority is coming from the left, and FIG. 4 schematically and functionally describes, in a view from above, the intersection of FIG. 3 after a forward and leftward movement of the first vehicle, as decided by its security device, and that allowed the first vehicle to be positioned diagonally so that the second vehicle hits it on its right side at a small acute angle.

In the first illustrative example of FIG. 1, the first vehicle V1 is stationary at the stop sign on the first traffic lane VC1 (at the intersection IS of the first and second roads), and a second vehicle V2 travels the first traffic lane VC1 (following the arrow F1) behind the first vehicle V1.

Figure 3:
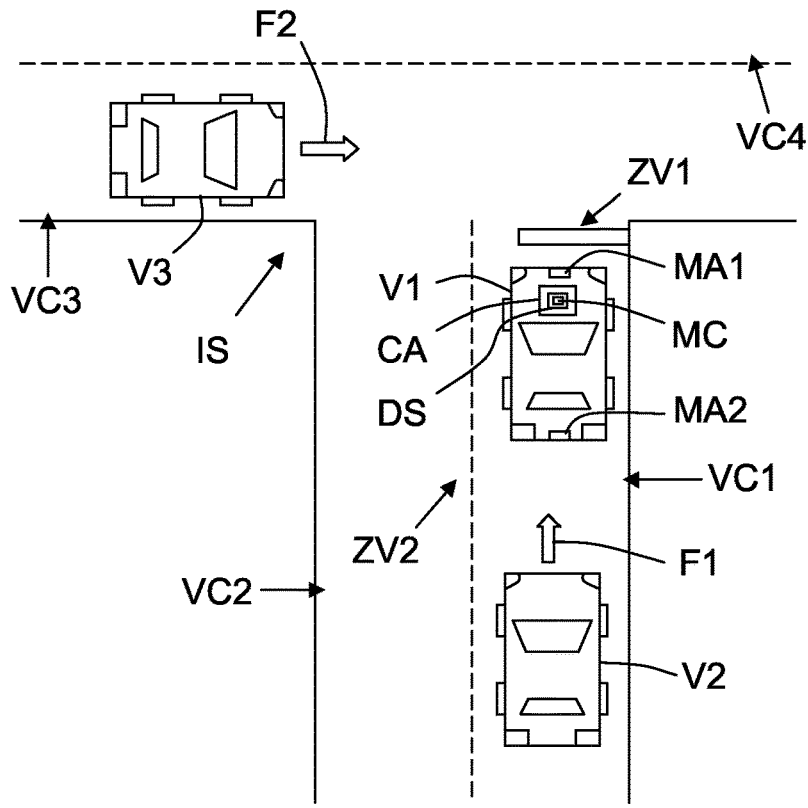

In the second illustrative example of FIG. 3, the first vehicle V1 is stationary at the stop sign on the first traffic lane VC1 (at the intersection IS between the first and the second roads), a second vehicle V2 travels the first traffic lane VC1 (following the arrow F1) behind the first vehicle V1, and a third prioritized vehicle V3 travels the third traffic lane VC3 (following the arrow F2) just before the intersection IS.

As shown in the FIGS. 1 to 4, the first vehicle V1 is equipped with a security device DS and analysis means MAj (here j=1 or 2) adequate to analyze its environment. The "environment" means the exterior space around the first vehicle V1 in front of its front bumper, behind its rear bumper, and along its two lateral sides (right and left).

The analysis means (of the environment) MAj may include, for example, ultrasonic sensors and/or at least one camera, and/or at least one scanning laser, and/or at least a radar or a lidar. Thus, the analysis means MA1 at the front can include, for example, ultrasonic sensors (or a scanning laser or a radar or a lidar) and a camera, and the analysis means MA2 at the rear can include, for example, ultrasonic sensors (or a scanning laser or a radar or a lidar).

For example, the analysis means MAj provides an onboard computer CA with the results of its analyses, i.e. data about the environment, in particular about the presence of a fixed or movable obstacle (vehicle, pedestrian or animal), the distance between the first vehicle V1 and this obstacle and the relative speed of this obstacle relative to the first vehicle V1.

The security device DS, using these data about the environment, can be part of the computer CA, as non-limitingly shown, in the FIGS. 1 to 4. But it is not compulsory: this security device DS can be a piece of equipment coupled to the computer CA, directly or indirectly. It can notably be a part of another computer or appliance. Therefore, the security device DS can also be made as software modules or as a combination of hardware circuits and software modules.

A security device DS, includes control means MC that is designed to work when the first vehicle V1 is stationary with an open contact and at risk of collision of the first vehicle V1 by a second vehicle V2 behind the first vehicle (as in the two examples in the FIGS. 1 and 3). Each time these three conditions are met, the control means MC is designed to determine whether there is at least, at the current time, one accessible empty zone ZVk for the first vehicle V1 in the environment that the analysis means MAj has analyzed.

If there is at least one accessible empty zone ZVk around the first vehicle V1, the control means MC is designed to determine a route for the first vehicle (V1) through this empty zone ZVk (or through any one of these empty zones ZVk) to at least minimize the consequences of the rear collision, whose risk has been detected. Then, the control means MC is designed to initiate a movement of the first vehicle V1 along this set route.

It will be understood that at least the powertrain, the brake system, and the electric power steering have to be automatically controlled to make it possible for the first vehicle V1 to move along the determined route. This is possible, in particular, by means of equipment that form part of vehicles with advanced driver assistance systems (for example ADAS ("Advanced Driver Assistance System")).

This movement prevents a rear collision of the first vehicle V1 by the second vehicle V2. In the best case, the second vehicle V2 does not hit the first vehicle V1 at all, which makes it possible to totally save the integrity of the first vehicle V1 and its passengers, as can be seen below in the FIG. 2. In the worst case, the second vehicle V2 hits the first vehicle V1 on to one of its lateral sides (right or left), which notably minimizes the consequences to the first vehicle V1 and its passengers, as can be seen below in the FIG. 4.

It should be noted that the control means MC is also designed to trigger a warning to the passenger(s) of the first vehicle V1 in case of detection of a collision risk. For example, this alert can be triggered by an acoustic message from at least one loudspeaker of the first vehicle V1.

It should also be noted that control means MC can also be advantageously designed to turn on the car lighting of the first vehicle V1 and/or to turn on an acoustic alarm of the first vehicle V1 in case of detection of the collision risk in order to warn the external environment of the first vehicle V1.

For example, the car lighting can be brake lights or hazard lights. In the case of brake lights, they can work alternatively for a better warning effect.

As previously mentioned, two situations may happen if there is at least one accessible empty zone ZVk around the first vehicle V1.

Figure 2:
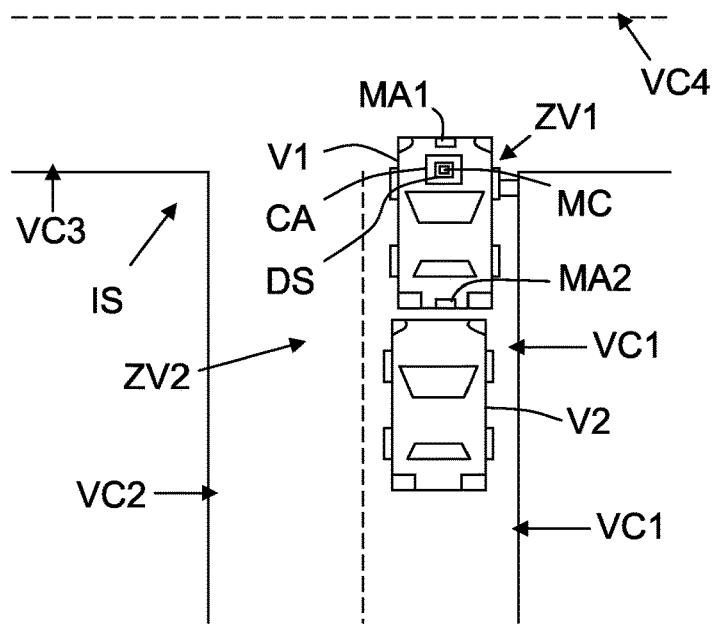

A first situation is shown in FIGS. 1 and 2: the control means MC has detected a first empty zone ZV1 (k=1) in front of the first vehicle V1 and a second empty zone ZV2 (k=2) at the rear left of the left lateral side of the first vehicle V1 due to the analyses of the environment by the analysis means MAj. In this case, the first empty zone ZV1 is particularly advantageous because it can admit at least a part of the first vehicle V1, since there is no high-priority vehicle on the third traffic lane VC3.

Therefore, in case of detection of an empty zone ZVk (here ZV1) in front of the first vehicle V1, the control means MC can be designed to determine a linear forward route for the first vehicle V1 to this empty zone ZVk. It should be noted that this forward linear route increases the distance between the first vehicle V1 and the second vehicle V2, thus it gives the second vehicle V2 a longer braking distance to stop before the first vehicle V1. In the example of FIG. 2, the forward movement of the first vehicle V1 of about 2 meters allowed the second vehicle V2 to stop before hitting.

It should be noted that it is preferable that the control means MC be designed to set a forward linear route with a minimal length (the shortest possible route) to prevent a frontal collision of the first vehicle V1. Such a frontal collision may happen if a third vehicle V3 were travelling the third traffic lane VC3 on the left of the intersection IS. This minimal length notably depends on the braking distance that the second vehicle V2 needs to stop, considering the speed of the second vehicle V2 and the environment in front of the first vehicle V1. A radar, a lidar or a scanning laser can scan in real time the speed and the route of the second vehicle V2 and of the other vehicles that may travel the other neighboring traffic lanes in order to calculate the convenient movement of the first vehicle V1. It should be understood that a third vehicle V3 coming from the left on the third traffic lane VC3 requires a reduction in the length or path along which the first vehicle V1 can move in order to avoid a frontal collision.

Figure 4:
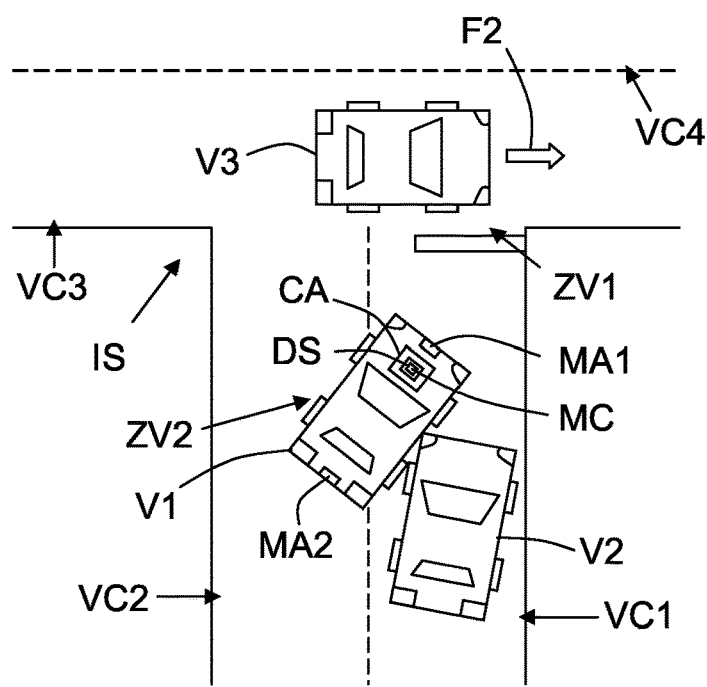

A second situation is shown on FIGS. 3 and 4. In this case, the control means MC has also detected a first empty zone ZV1 (k=1) in front of the first vehicle V1 and a second empty zone ZV2 (k=2) at the rear left of the left lateral side of the first vehicle V1 due to the analyses of the environment by the analysis means MAj. But the control means also detected a third vehicle V3 on the third traffic lane VC3 approaching the intersection IS from the left, and with third vehicle having a high-priority. Therefore, the control means MC cannot use this first empty zone ZV1 where the third vehicle V3 will soon be, and it can only use the second empty zone ZV2 at the rear left of the left lateral side of the first vehicle V1.

As a result, in the case where there is no empty zone ZV1 in front of the first vehicle V1 but an empty zone ZV2 at a rear lateral part of the first vehicle V1 (here on the left), the control means MC can be designed to determine a curved route to the rear into this empty zone ZV2 for the first vehicle V1, so that the second vehicle V2 collides diagonally with a lateral side of the first vehicle V1, as shown in FIG. 4. It should be understood that allowing a maneuver of the first vehicle V1 to follow this curved route, requires that the direction of the guide wheels can be controlled automatically.

The smaller the angle of incidence of the second vehicle V2 to the lateral side (here to the right) of the first vehicle V1, the more the second vehicle V2 can "slide" against the first vehicle V1, hence the smaller the consequences of the collision. In addition, as shown in FIG. 4, since the first vehicle V1 moves back away to the left, a little space is left to the right of the first vehicle V1 so that the second vehicle V2 can slightly maneuver to the right, which may be enough for the second vehicle V2 to pass to the right of the first vehicle V1 without hitting the first vehicle V1.

It should be noted that, if two empty zones ZVk are detected on the right and on the left of the rear part of the first vehicle V1, the control means MC is preferably designed to set a curved route rearward for the first vehicle V1 to the empty zone ZVk on the lateral side closer to the driver. This option is made to guarantee the absorption of the shock by the opposite side to the driver of the first vehicle V1, so that the driver is not wounded and can maneuver the first vehicle V1 after the lateral collision, if it remains possible.

If there is no accessible empty zone ZVk around the first vehicle V1, the control means MC can be designed, for example, to trigger an alert to the passengers of the first vehicle V1 (for example by means of an audible message from at least one loudspeaker), to pre-tension the seat belts, and operation of the car lighting and/or the horn to warn the outer environment, and possibly to close the open windows and the sunroof and/or to move movable seats to the front and/or to increase the pressure of the brakes and/or to trigger a security movement of the head supports.

It should be noted that the detection of the risk of collision can be made either by the security device DS according to environment data from the analysis means MAj, or by any other onboard system in the first vehicle V1, such as a monitoring system for the whole "environment perception" data of the first vehicle V1.

It should also be noted that the analysis means MAj can be a part of the security device DS.

Below is described a non-limiting example of an algorithm (or process) to secure the first vehicle V1.

The algorithm is started when the first vehicle V1 is stationary with an open contact, while a risk of rear collision of the first vehicle V1 by a second vehicle V2 has been detected. If the first vehicle V1 has a STT-type system, the control means MC restarts the internal combustion engine, then the control means MC checks if there is at least one accessible empty zone ZVk in the environment of the first vehicle V1.

If yes, the control means MC determines a route through this empty zone ZVk. Then, the control means MC initiates a movement of the first vehicle V1 along this determined route, possibly with simultaneous (or previous) warning to the passengers (preferably an audio warning), and possibly with turning on the car lighting and/or the horn. In case of rearward curved route, the control means MC can also prepare the first vehicle V1 for collision, for example by pre-tensioning the seat belts and activating the car lighting and/or the horn, possibly by closing the open windows and the sunroof, if any, and/or by moving forward the movable seats and/or increasing the pressure of the brakes and/or triggering a securing movement of the head supports.

If no, the control means MC warns the passengers of the first vehicle V1 (preferably with an audio warning) and prepares the first vehicle V1 for collision, for example by pre-tensioning the seat belts and activating the car lighting and/or the horn, possibly by closing the open windows and the sunroof, if any, and/or by moving forward the movable seats and/or increasing the pressure of the brakes and/or triggering a securing movement of the head supports.

The invention claimed is:

1. A security device for a first vehicle including analysis means designed to analyze an environment outside of the first vehicle, wherein the security device includes control means designed, when said first vehicle is stationary with open contact and at risk of collision of said first vehicle with a second vehicle on the traffic lane behind said first vehicle, to determine whether there is, inside said environment analyzed by said analysis means, at least one empty zone accessible to said first vehicle and, if so, to determine for said first vehicle a route through said empty zone to at least minimize the consequences of said collision, and then to initiate the movement of said first vehicle according to said route while taking into account the presence of any third vehicle on another traffic lane, in the environment of the first vehicle, and wherein said control means is designed, in case of no empty zone in front of said vehicle but detection of an empty zone on a lateral rear part of said first vehicle, to determine for said first vehicle a curved route to the rear part of said determined empty zone, so that said second vehicle collides diagonally with a lateral part of said first vehicle.

2. The device according to claim 1, wherein said control means is designed, in case of detection of said risk of collision, to initiate a warning to passenger of said first vehicle.

3. The device according to claim 1, wherein said control means is designed, in case of detection of said risk of collision, to turn on lighting and/or an acoustic alarm of said first vehicle in order to warn said environment of the movement of said first vehicle.

4. The device according to claim 3, wherein said car lighting is selected from a group including brake lights and hazard lights.

5. The device according to claim 1, wherein said control means is designed, in case of detection of an empty zone in front of said first vehicle, to determine for said first vehicle a linear forward route through this determined empty zone.

6. The device according to claim 5, wherein said control means is designed to determine a linear forward route of a minimal length in order to prevent any collision in front of said first vehicle.

7. The device according to claim 1, wherein said control means is designed, in case of detection of two empty zones on the right and on the left of a rear part of said first vehicle, to determine for said first vehicle a curved route to the rear of the empty zone that is on a lateral side adjacent to the driver of said first vehicle.

8. A vehicle including analysis means adequate to analyze an environment around the vehicle, wherein the vehicle additionally includes the security device according to claim 1.

9. The vehicle according to claim 8, wherein the vehicle is a car.

* * * * *